United States Patent [19]

Kuziak, Jr. et al.

[11] 4,206,596
[45] Jun. 10, 1980

[54] DUAL SHAFT GASIFIER SPOOL FOR TWO SHAFT GAS TURBINE ENGINE

[75] Inventors: William R. Kuziak, Jr., Sterling Heights; Elias H. Razinsky, Troy; Mason K. Yu, Birmingham, all of Mich.

[73] Assignee: General Motors Corporation, Detroit, Mich.

[21] Appl. No.: 942,356

[22] Filed: Sep. 14, 1978

[51] Int. Cl.² ............................................. F02C 3/10
[52] U.S. Cl. ........................... 60/39.16 R; 74/DIG. 5
[58] Field of Search ................... 60/39.16 R, 39.16 S; 74/DIG. 5

[56] References Cited

U.S. PATENT DOCUMENTS

| | | | |
|---|---|---|---|
| 2,197,197 | 4/1940 | Hersey | 60/608 |
| 2,960,825 | 11/1960 | Sampietro et al. | 60/39.16 R |
| 3,287,903 | 11/1966 | Wickman | 60/39.16 S |
| 3,997,283 | 12/1976 | Kronogard | 60/39.16 R |

Primary Examiner—Louis J. Casaregola

Attorney, Agent, or Firm—J. C. Evans

[57] ABSTRACT

A gas turbine engine for vehicular road type operation includes a gasifier spool and a power turbine spool driven by gases from a gas turbine engine combustor and wherein the gasifier spool includes first and second shaft portions thereon one of which is connected to the gasifier compressor and the other of which is connected to the gasifier turbine. A clutch and brake controlled planetary gear set cooperate to define a rotor speed responsive lock-up assembly for controlling relative rotation of the two shaft portions of the gasifier spool and include means responsive to compressor discharge pressure and a first speed of the gasifier turbine shaft portion to control engagement of a clutch and control release of a planetary gear set brake band to cause both shaft portions of the gasifier spool to either rotate as a single unit or at a predetermined speed difference for maintaining optimal, aerodynamically improved incidence angles of gas flow across the gasifier turbine blades during both part load vehicle operation and full road load vehicle operation.

3 Claims, 8 Drawing Figures

LOW SPEED LOCKUP DESIGN

HIGH SPEED LOCKUP DESIGN

DUAL SHAFT GASIFIER SPOOL FOR TWO SHAFT GAS TURBINE ENGINE

This invention relates to gas turbine engines for vehicular road applications and more particularly to such a two shaft turbine engine including a gasifier turbine spool having a gasifier compressor and a gasifier turbine with airfoil blades having an incidence angle of gas flow thereacross which varies in accordance with vehicle load and speed and wherein control means are utilized to vary dynamic gas flow patterns to improve part load efficiency of the gasifier turbine.

Conventional two shaft free turbine engines have a gasifier spool and a power turbine spool. The gasifier spool has a gasifier compressor and a gasifier turbine located at opposite ends of the same shaft. Such an arrangement constitutes a mechanical constraint as well as an engine cycle constraint that can produce an aerothermal mismatch between the compressor and gasifier turbine at part load conditions. Such a mismatch can force the gasifier turbine to operate in a low efficiency region of its performance map. This problem is particularly evident in cases where the gasifier spool is in a vehicular road type gas turbine engine that is subjected to vehicular duty cycles including substantial operating periods under part load modes of operation requiring low power output from the engine.

The use of gear sets to control power transfer from a compressor to a turbine are known. For example, one such arrangement is set forth in a single shaft gas turbine engine of the type set forth in U.S. Pat. No. 3,997,283 issued Dec. 14, 1976 to Kronogard. In this arrangement, a gear set is interposed between a gasifier compressor and a power output turbine. However, the power output turbine requires an infinitely variable transmission in association therewith to direct power to a load. It has been found that such infinitely variable transmissions have an excessive cost and include technological limitations which preclude mass production for automotive applications.

The present invention, on the other hand, has application in common two shaft free turbine engines with a gasifier turbine and a power turbine on separate spools being driven by exhaust from a single combustor as is typically the case in automotive gas turbine engine applications. Such arrangements have a demonstrated performance and are suitable for use with existing automatic, mass produced transmissions. Finally, the Kronogard disclosure does not describe any aerothermodynamic benefit produced through the illustrated separation of a gas turbine spool into two components connected respectively to a compressor and a turbine.

U.S. Pat. No. 2,960,825 issued Nov. 22, 1960 to Sampietro et al discloses a gas turbine engine which includes a multi-stage primary centrifugal compressor driven by a high pressure turbine and a single stage secondary centrifugal compressor and an output transmission driven by a low pressure power turbine on a separate shaft. Gearing is not applied between the compressor and high pressure turbine for matching the aerothermodynamic characteristics of gasifier spool components. Rather, in the Sampietro engine, gearing is located at the power output shaft and the secondary centrifugal compressor. There is no aerothermodynamic improvement produced by matching the gasifier compressor and gasifier turbine of the gasifier spool of a two shaft gas turbine engine to produce an improved efficiency of gas flow across the turbine vane components of a gasifier spool under part load vehicle operation with resultant fuel economy improvement.

U.S. Pat. No. 2,197,179 issued Apr. 16, 1940 to Hersey discloses an internal combustion engine wherein energy contained in the exhaust is used by a turbine to drive accessories to assist the internal combustion engine. The primary source of output shaft power is the internal combustion engine rather than the gas turbine. The proposal in the Hersey patent does not improve turbine or overall automotive engine power cycle efficiency.

A basic principle of gas turbine engine technology is that increased component efficiency can improve the overall thermodynamic efficiency of the engine operating cycle. Such improvement in thermodynamic efficiency will produce an improved fuel economy. The present invention is directed to improvements in dual shaft gas turbine engines aimed at increasing overall efficiency therein with resultant improvement in fuel economy. The improved results have been demonstrated both in analysis as well as in testing.

One provision for improved high component efficiency is the manner in which total air flow through the gas turbine engine impinges upon the airfoil shaped blades in the blade row of a high pressure turbine, in the case of a two shaft gas turbine engine, the gasifier turbine.

In automotive type dual shaft gas turbine components, the compressor, regenerator, seal, gasifier turbine and power turbine each play a separate but measurable part in the overall performance characteristics of the engine. The present invention is designed to harness the existing higher gasifier off-design efficiency by use of a speed differential device interposed between the gasifier compressor and gasifier turbine to establish an improved incidence angle of air flow across the entrance to the blade row of the gasifier turbine to reduce blade flow losses thereby to improve transient acceleration characteristics and fuel economy at given operating temperature levels of gas turbine engine operation.

Accordingly, an object of the present invention is to provide an improved gas turbine engine for automotive use including a gasifier spool and a power turbine drive spool wherein existing higher gasifier off-design efficiency is harnessed by use of means including a speed differential device between the gasifier compressor and gasifier turbine which will change the relative drive speed between the compressor and gasifier turbine in accordance with speed differential between the gasifier compressor speed and gasifier turbine speed during engine operation to produce an improved match of aerothermodynamic gas flow from the gasifier compressor and from a combustor and inlet nozzle to a blade row on the gasifier turbine to maintain higher efficiency power extraction from the gas flow across the gasifier turbine as well as to reduce operating stresses in the blade components of the gasifier turbine unit during both part load and full load modes of gas turbine engine operation.

Another object of the present invention is to provide an improved two shaft, free gas turbine engine for use in automotive gas turbine engine applications wherein mechanical constraint between a gasifier spool compressor and a gasifier spool turbine is reduced by the provision of gasifier spool speed responsive lock-up system comprising a brake controlled gear set and a clutch operative during a first rotational speed of the gasifier spool to cause the gasifier compressor and a gasifier turbine to rotate as a single unit to produce a desired aerothermodynamic design at the gasifier turbine blades wherein the incidence angle of gas flow across the gasifier turbine blades is at a near zero angle of incidence and wherein at a second rotational gasifier spool speed, the clutch and gear set are conditioned to cause the gasifier turbine to rotate at a speed different than that of the gasifier compressor thereby to control the entrance negative incidence angle of gas flow across the gas turbine blades to produce lower blade losses with resultant higher gasifier turbine efficiency.

Still another object of the present invention is to improve gas turbine engine fuel economy in two shaft free gas turbine engines by the provision of a low speed lock-up assembly between first and second shaft portions of a gasifier spool connected respectively to a gasifier compressor and a gasifier turbine and wherein control means detect low speed spool operation to directly couple the gasifier compressor to the gasifier turbine to eliminate gear friction losses during low load, low speed modes of engine operation which are predominant in automotive type applications, and wherein means are provided to condition the low speed lock-up assembly to couple the gasifier turbine to the gasifier compressor through a speed reduction gear set to cause the gasifier turbine to rotate slower than the gasifier compressor thereby to reduce the entrance negative incidence angle of gas flow across the blades of the gasifier turbine to reduce blade losses as well as to lower stresses in the operating blades of the gasifier turbine unit.

A further object of the present invention is to provide an improved two shaft gas free turbine engine including a high speed lock-up assembly wherein the gasifier spool turbine and gasifier spool compressor are interconnected together to be driven at 100% design speed and wherein the high speed lock-up assembly is conditioned when the gasifier spool is operated at a reduced percentage of design speed to cause the speed of the gasifier turbine unit to be greater than that of the gasifier compressor so that the entrance incidence angles of gas flow across the blades of the gasifier turbine will change from positive to negative at low speeds of gasifier turbine operation to improve gasifier turbine efficiency by reducing gas flow losses across the blades of the gasifier turbine.

Further objects and advantages of the present invention will be apparent from the following description, reference being had to the accompanying drawings wherein preferred embodiments of the present invention are clearly shown.

Figure 1:
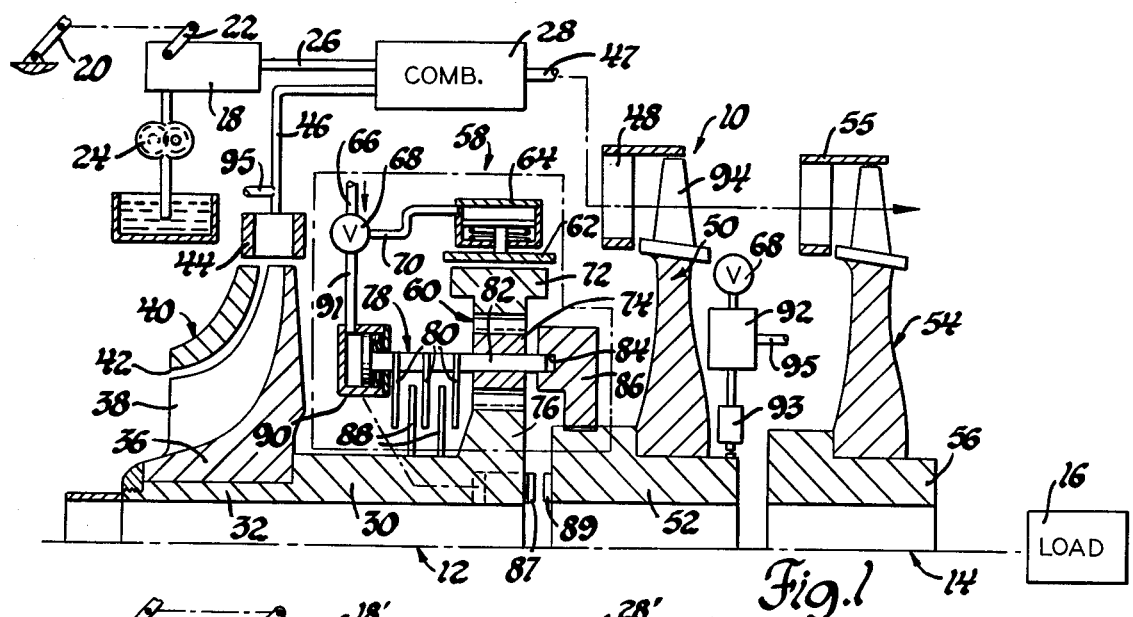
FIG. 1 is a diagrammatic view of a two shaft gas turbine engine including a low speed lock-up assembly embodiment of the present invention.

In FIG. 1 of the drawings, a two shaft gas turbine engine 10 is illustrated diagrammatically. It includes a gasifier spool 12 and a power output spool 14 connected to a suitable load 16. In the case of an automotive gas turbine engine, the load 16 constitutes a vehicle power transmission and a drive output to the driven vehicle wheels for propelling the vehicle. The duty cycle of automotive vehicles for passengers is mostly at low power levels of engine operation. Accordingly, fuel consumption at low power levels should be reduced without varying an engine cycle at higher power levels to incur performance or fuel consumption penalties. The engine 10 includes a fuel controller 18 connected to a suitable power demand device to meet a desired output power schedule on vehicle operator request. Thus, in the illustrated arrangement, an accelerator pedal 20 is illustrated coupled by an operator 22 to the fuel controller 18. Controller 18 is of the type set forth in U.S. Pat. No. 3,851,464 issued Dec. 3, 1974 to Davis et al. It includes means for regulating flow from a fuel pump 24 to a fuel supply line 26 connected to a combustor 28 for burning fuel from the supply line 26 with compressed air. In accordance with certain principles of the present invention, the gasifier spool 12 includes a first shaft portion 30 with an outboard extension 32 of reduced diameter that receives the hub 36 of a gasifier impeller 38 of a gasifier compressor 40 having an inlet 42 in communication with atmosphere and including an outlet diffuser 44 that is communicated through a conduit 46 to the combustor 28 thereby to direct compressed air into the combustor 28 for mixture and combustion with fuel supply from the line 26 to produce a high temperature motive fluid flow through a discharge conduit 47 to a turbine nozzle ring 48 that directs motive fluid across a high pressure gasifier turbine 50. In such arrangements, gas flow from the nozzle ring 48 impinges on the leading edge of blades in the blade row of turbine 50 at an entrance incidence angle which varies in accordance with blade row speed and with the ratio of the pressure at the entrance to the nozzle ring 48 to the pressure at the exit of turbine 50. The gasifier turbine 50 is connected to a second shaft portion 52 of the gasifier spool 12. A low pressure power turbine 54 with an inlet nozzle 55 is connected to an output shaft 56 of the power output spool 14 for directing power to the load 16. Turbine 54 receives motive fluid via nozzle 55 from the outlet of turbine 50 and exhausts to atmosphere.

The two shaft engine 10 in FIG. 1 includes a low speed lock-up assembly 58 in the gasifier spool 12 which is operative in accordance with the present invention to better coordinate the aerothermal design of the gasifier turbine 50 to the aerothermal design of the gasifier compressor 40. More particularly, the low speed lock-up assembly 58 includes a planetary gear set 60 having a brake band 62 under the control of a hydraulic actuator 64 connected to a hydraulic pressure source 66 under the control of a speed responsive valve 68 having an output line 70 connected to the hydraulic actuator 64. The hydraulic actuator 64 will locate the brake band 62 of the planetary gear set 60 into and out of engagement with an outer ring gear 72 to cause power transfer from a plurality of circumferentially spaced planet gears 74 to an inner sun gear 76 directly coupled to shaft portion 30 of the spool 12.

A diagrammatically illustrated clutch assembly 78 includes a plurality of input discs 80 carried by a carriage 82 that is slidably supported within a slot 84 in a hub extension 86 on the power turbine shaft portion 52 of the spool 12. The clutch assembly 78 further includes a plurality of output discs 88 secured to the shaft portion 30. When the clutch 78 is engaged discs 80, 88 synchronize clutch lock-up splined components 87, 89. Component 89 is pressurized to mesh with component 87 to directly couple the shaft portion 30 to the shaft portion 52. The clutch assembly 78 is conditioned between engaged and disengaged positions by a hydraulic actuator 90 that is in communication with a conduit 91 from the valve 68 for communication with the hydraulic pressure source 66. In the illustrated arrangement, the valve 68 is under the control of a controller in the form of a speed sensing and pressure controller 92 with tachometer pick-up 93 that senses the speed of the shaft portion 52. Controller 92 also receives a signal from a compressor discharge pressure tap 95. The controller 92 produces a resultant control point signal to the valve 68 for controlling pressurization of the hydraulic actuators 64, 90.

In the embodiment of FIG. 1, the aerothermal design of the gasifier turbine 50 is matched to the compressor 40 at low rotational speeds of the gasifier shaft portion 30. More particularly, at such low speeds a signal is generated by the controller 92 to cause the valve 68 to be conditioned to direct pressure to the hydraulic actuator 90 to condition the clutch assembly 78 to cause the discs 80, 88 to be moved to engagement with one another to synchronize shaft portions 30, 52 followed by lock-up of components 87, 89. Simultaneously, the hydraulic actuator 64 is conditioned to direct an outward force on the band 62 to cause it to be released from the ring gear 72. Consequently, the hub extension 86 is directly coupled by the engaged splined components 87, 89 to the shaft portion 52 to cause the gasifier turbine 50 to rotate as a single unit with the gasifier impeller 38 under low speeds of operation.

Figure 3:
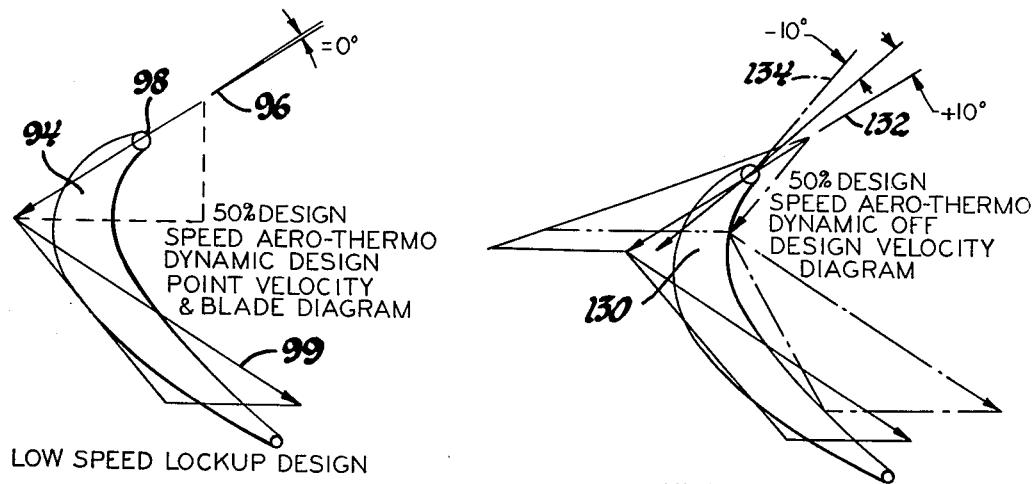
FIG. 3 is a two-dimensional gas flow and velocity diagram of an airfoil shaped blade in a blade row of a gasifier turbine in the low speed lock-up embodiment of the present invention.

In the embodiment of FIG. 1, the gasifier turbine 50 has a row of circumferentially spaced, airfoil shaped blades 94 thereon one of which is diagrammatically shown in FIG. 3. At the low speed lock-up condition, the blade 94, as shown in FIG. 3, has an air flow entrance angle incidence vector 96 which is 0° with respect to the leading edge 98 of the airfoil shaped blade 94 and thereby to cause an optimized exit vector 99 to produce lower blade gas flow losses and also to reduce stresses in the blade 94. Moreover, during low speed lock-up, there is no gear friction losses imposed in the low load, low speed region of gas turbine engine operation, a region which occurs during a substantial part of the duty cycle of an automotive gas turbine engine.

Under conditions of engine operating approaching 100% design speed in spool 12, prior two shaft gas turbine engines with rigidly connected gasifier impellers and gasifier turbines and with gasifier turbine blades 94 configured to have zero incidence angle at low speed, have a high negative incidence angle of approach of the gas to leading edge 98 of the blade 94 which can produce excessive blade flow loss. In the present invention, however, at 100% design speed of operation, the controller 92 will impose a signal on the valve 68 to depressurize the hydraulic actuator 90 and will pressurize the actuator 64 to simultaneously disengage the clutch assembly and direct the brake band 62 into engagement with the outer ring gear 72. As a result, the planetary gear set 60 is interposed between shaft portions 52, 30 and the gasifier turbine 50 is rotated slower than the compressor. This causes gas flow across the nozzle 48 and blade row 94 to have a reduced entrance negative incidence angle than would otherwise be the case if the shaft portions 30, 54 were retained in a lock-up mode at the higher speed of operation. As a result, desirable lower blade flow losses and lower stresses are retained during a 100% design speed of operation and the existing higher gasifier off-design efficiency is retained by installation of a speed differential device in the spool 12 as represented by the planetary gear set 60 which is selectively coupled between the gasifier compressor 40 and the gasifier turbine 50 in accordance with engine gasifier spool speed.

In the embodiment of FIG. 1, the lock-up speed range is in a part load speed from 50% to 70% of the full 100% design speed of the gasifier spool 12 wherein speed of the gasifier compressor 40 corresponds to that of the gasifier turbine 50.

The planetary gear set 60 functions during a higher speed range from 70% to 100% of the design speed of the gasifier spool 12. Under this condition of operation, the speed of the gasifier compressor 40 is greater than that of the gasifier turbine 50. The invention makes use of the design efficiency produced by having a zero incidence angle of gas flow across the blade 94 during the low speed of operation which is shown in FIG. 3. By virtue of the inclusion of the planetary gear set 60 at the higher speed range of operation of the embodiment in FIG. 1, excessive negative incidence angles of approach of gas flow across the leading edge 98 of the blades 94 are avoided. As a result, there is increased component efficiency at the blades 94 of the gasifier turbine 50 to produce an improved power output from the gasifier turbine 50 for a given pressure ratio thereacross and resultant improvement in overall fuel economy for the gas turbine engine.

Figure 2:
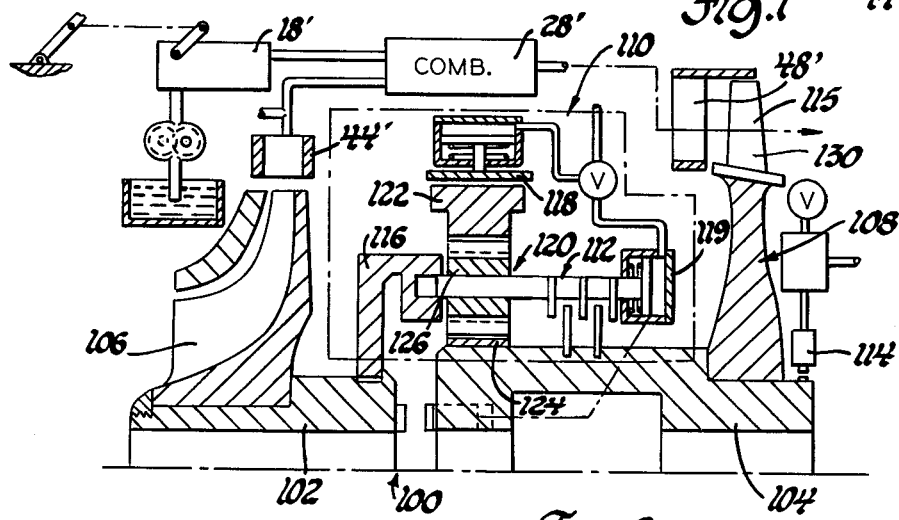
FIG. 2 is a view like FIG. 1 showing a high speed lock-up embodiment of the present invention.

A second embodiment of the present invention is illustrated in FIG. 2 which shows a gasifier spool 100 of a second embodiment of the invention with all other components of the gas turbine engine of the type set forth in FIG. 1 being omitted for simplication of the description of the invention. In this arrangement, the gasifier spool 100 is comprised of a first shaft portion 102 and a second shaft portion 104 connected respectively to a gasifier impeller 106 corresponding to the gasifier impeller 38 and the gasifier turbine 108 corresponding to the gasifier turbine 50 in the embodiment of FIG. 1.

Portions of the engine which are like those shown in the embodiment of FIG. 1 are marked with primed reference numerals where the parts correspond to those found in the first embodiment.

This form of the invention includes a high speed lock-up assembly 110 operative to cause the gasifier impeller 106 and gasifier turbine 108 to be interlocked at a matched speed at 100% of the design speed of spool 100. In this arrangement, a clutch 112 with components like those in clutch 78, is associated with a hub extension 116 on the first shaft portion 102 fixedly secured thereto so that when the clutch 112 is energized the shaft portion 102 will be directly coupled to the shaft portion 104, this operating mode occurring at high speeds of gas turbine engine operation for the gasifier spool 100, for example, in the range of from 70% to 100% of the design speed of the gasifier spool 100. At this range the gasifier turbine 108, blade row 115 has an entrance angle of gas flow of two degrees as seen at point 117 in the chart of FIG. 7. At low load, low speed engine operation a differential speed tachometer 114 produces a signal to cause the clutch 112 to be disengaged by a hydraulic operator 119. A brake band 118 of a planetary gear set 120 is conditioned to engage an outer ring gear 122 of the gear set 120 to cause the rotation of the shaft portion 104 to be transferred from the sun gear 124 on the shaft portion 104 thence to a plurality of circumferentially spaced planet gears 126 which are driven with respect to the fixed outer ring gear 122. When the high speed lock-up assembly 110 is so conditioned, the speed of the gasifier turbine 108 will be greater than that of the compressor impeller 106. This will control the entrance incidence angle of gas flow against the leading edge of blades 130 in blade row 115 on turbine 108 under low speeds of operation, for example, from 50% to 70% of the part load speed of the gas turbine engine to improve the flow pattern of gas across a row of turbine blades 130 one of which is shown in FIG. 4.

Figure 4:
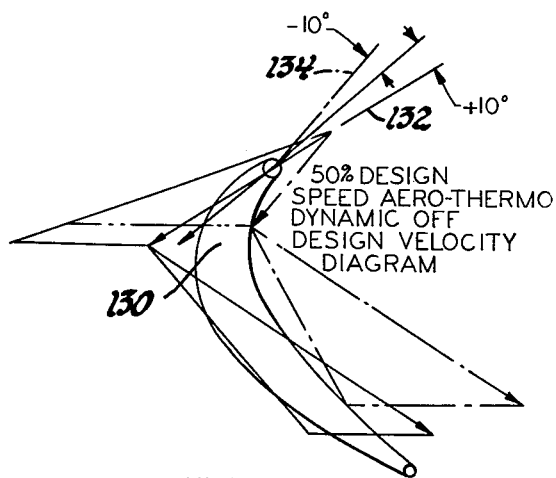
FIG. 4 is a two-dimensional gas flow and velocity diagram of an airfoil shaped blade in a gasifier turbine blade row in the high speed lock-up embodiment of the present invention.

The vector 132 in FIG. 4 represents a positive entrance incidence angle against blades 130 of about ten degrees which is produced when the shaft portions 102, 104 are directly coupled. Such an incidence angle produces blade losses which reduce turbine efficiency as seen by the incidence angle line 133 in FIG. 7.

In the present invention, the speed difference produced by planetary gear set 120 between gasifier turbine 108 and gasifier compressor 106 produces an entrance incidence angle which is more negative. Vector 134 represents a desired shift from a high positive incidence angle to a negative entrance incidence angle of gas flow to the blades 130 of minus 10 degrees in the 50 to 70% speed range of spool 100 where the speed of the gasifier compressor is less than that of the gasifier turbine 108.

Figure 5:
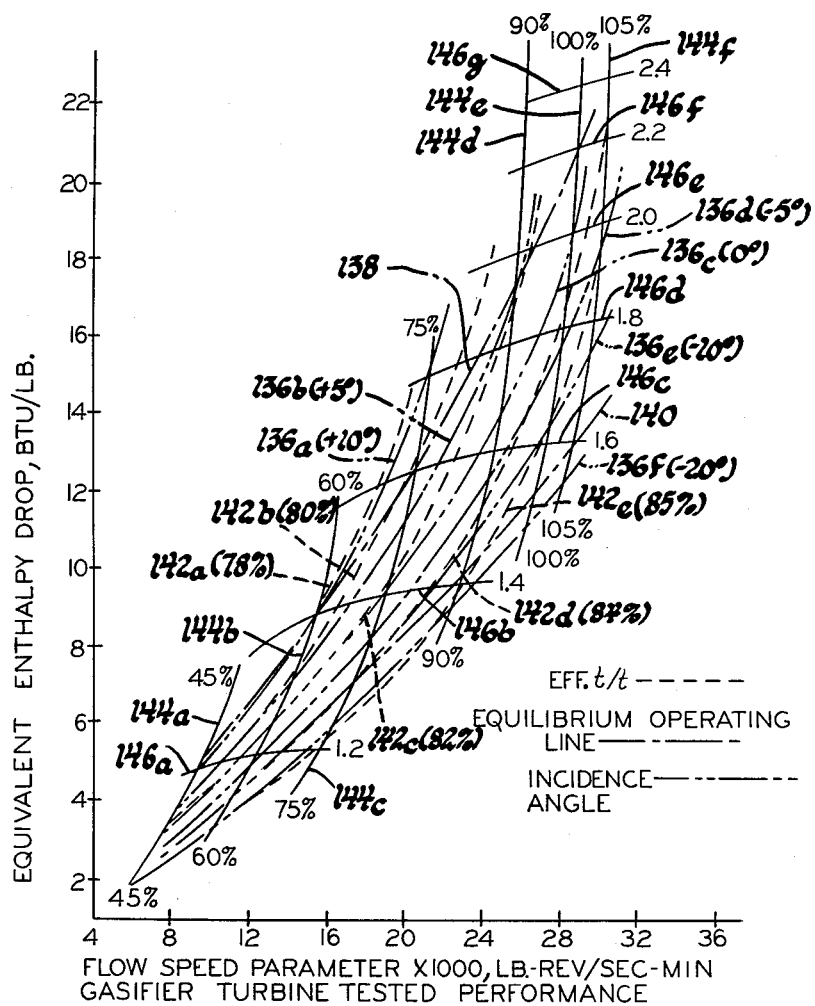
FIG. 5 shows an enthalpy drop and flow speed parameter chart of gasifier turbine performance in a two shaft gas turbine engine including the high speed lock-up embodiment of the present invention.

To better understand the function of the present invention, FIG. 5 is included to show a typical gasifier turbine performance with the high speed lock-up matching assembly 110 of the embodiment of FIG. 2. The curves 136a-136f show calculated constant rotor blade incidence angles at various gas flow speeds through the gasifier turbine 108. The curve 138 represents high speed operation where there is no speed differential between the compressor impeller 106 and the gasifier turbine 108 as shown at the curve 138. The curve 140 represents an engine equilibrium operating schedule for a low speed, part load range of operation of the gasifier spool 100 in FIG. 2. As can be seen in the curve of FIG. 5, the operating schedule represented by the curve 140 causes the engine to operate in a higher efficiency region where gasifier turbine efficiency (t/t) is represented by the family of curves 142a-142e showing gasifier turbine efficiencies of from 78% to 90% respectively. Curves 144a-144f are spool speed curves. Curves 146a-146g are pressure ratio curves of pressure ratio across the turbine inlet nozzle 48' to the exit of turbine 108.

Figure 6:
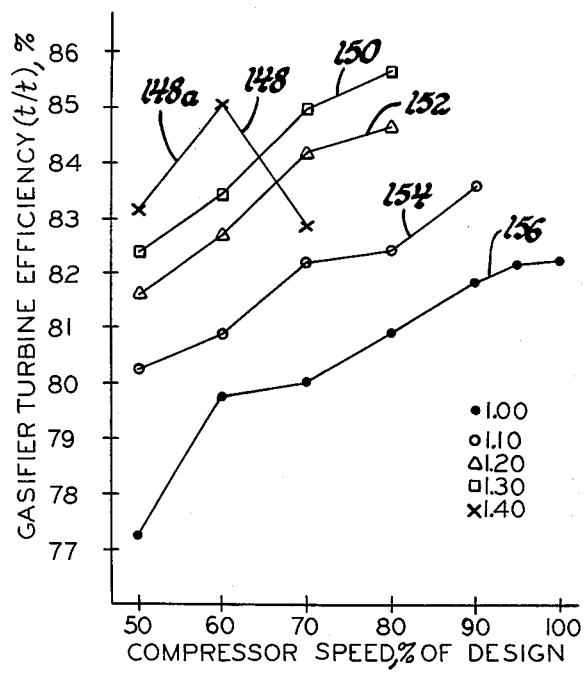
FIG. 6 is a chart of gasifier turbine efficiency versus gasifier compressor speed for the high speed lock-up embodiment of the present invention.

As can be seen in the chart of FIG. 5, the inclusion of the planetary gear set 120 in the gasifier spool 100 causes the curve 140 where the gasifier turbine speed is 1.4 times that of the compressor speed. The engine equilibrium operating schedule of line 140 closely correspond to the 85% efficiency line for gasifier turbine efficiency during the part load condition of engine operation. This improved efficiency is most desirable because of the fact that most of the engine operating mode in a vehicular application is in the part load range as shown in FIG. 6 between 50% and 60% of the compressor speed in percent of 100% design speed. This operating range and the improved efficiency therein is shown by the curve 148 and more particularly by the positive sloped portion 148a thereof. Corresponding curves 150, 152, 154, 156 are shown in the chart of FIG. 6 to show the general trend lines for gasifier turbine efficiency (t/t) calculated for gear ratios in the planetary gear set 120 of from 1.4 to the gear ratio of 1 which represents the shaft portion 104 being directly coupled to the shaft portion 102 of the gasifier spool 100.

Figure 7:
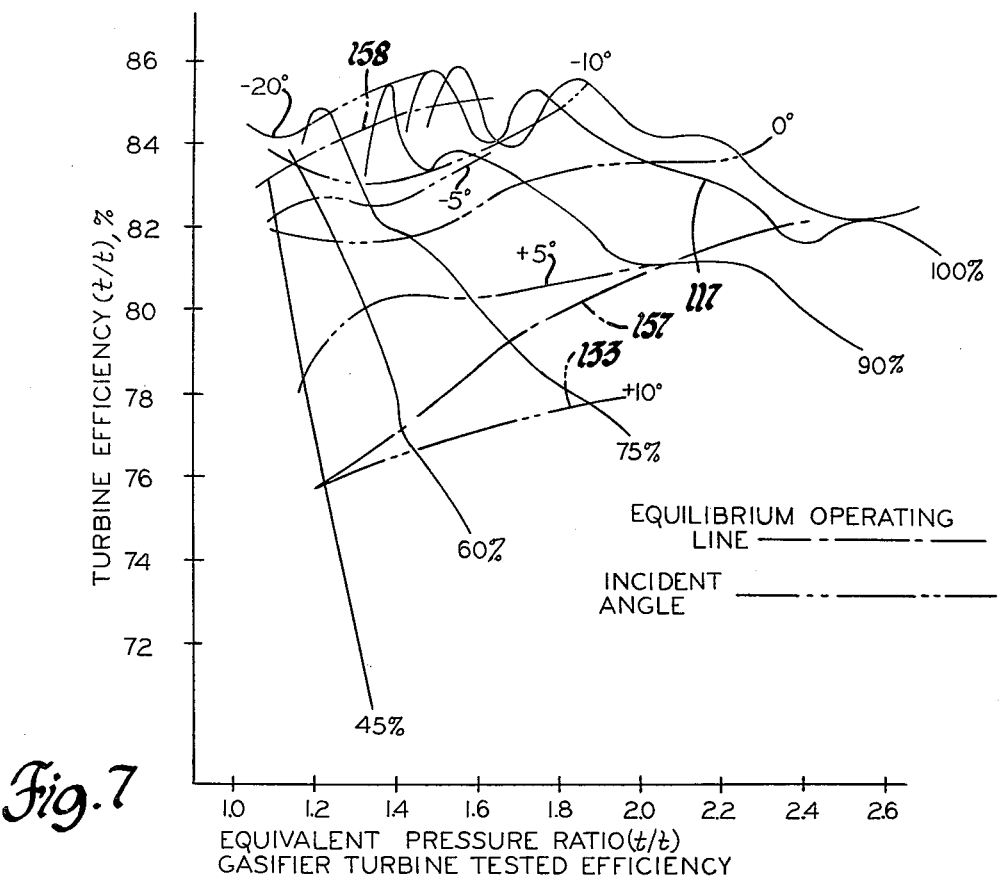
FIG. 7 is a chart showing gasifier turbine efficiency versus equivalent pressure ratio for the gasifier compressor and turbine embodiment of FIG. 2.

FIG. 7 is typical gasifier turbine performance using the data of FIG. 5 to show a performance map that demonstrates increased gasifier turbine efficiency as the entrance incidence angle is made more negative. In the chart of FIG. 7, the curves 157, 158 show gasifier turbine equilibrium operating lines which are for no speed differential between the gasifier compressor 106 and the gasifier turbine 108 and for a gasifier turbine speed of 1.4 times that of the compressor speed respectively. Curves 157, 158 thus correspond to the equilibrium operating curves 138 and 140. The chart shows a map of gas turbine speeds of from 45% to 105% of the design speed of the gasifier spool 100. Calculated entrance incidence angles for gas flow to the blades of the gasifier turbine 108 in the embodiment of FIG. 2 are designated wherein it is illustrated clearly that more negative incidence angles in this embodiment of the present invention will produce an even increasing turbine efficiency as shown by the ordinate line of the curve in FIG. 7.

Figure 8:
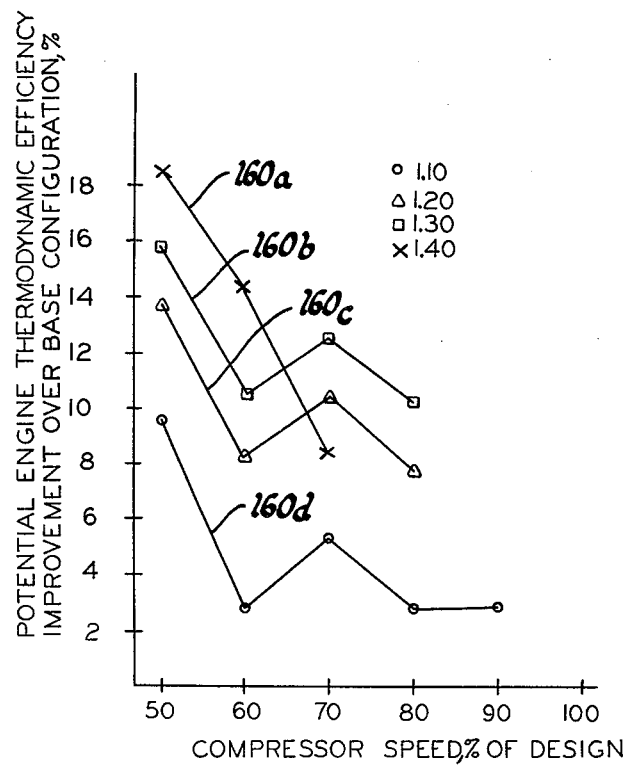
FIG. 8 is a chart of parametric studies of potential gasifier and overall engine thermal efficiency produced by changes in the gear ratio of the high speed lock-up embodiment of the present invention.

FIG. 8 has a family of curves 160a-160d which summarizes the potential efficiency gains for gear sets with gear ratios of from 1.10 to 1.40 in planetary gear set 120 in the high speed lock-up embodiment of the invention.

While the embodiments of the present invention, as herein disclosed, constitute a preferred form, it is to be understood that other forms might be adopted.

The embodiments of the invention in which an exclusive property or privilege is claimed are defined as follows:

1. In a dual shaft gas turbine engine having a gasifier turbine for driving a compressor to supply engine air and a power turbine for supplying energy to a driven load and including a combustor for burning air and fuel to supply motive fluid to both the gasifier turbine and the power turbine, the improvement comprising: a two part gasifier spool shaft including a first portion connected to the gasifier compressor and a second portion connected to the gasifier turbine, speed responsive lock-up means for selectively connecting and disconnecting said first and second shaft portions for controlling the gas flow angle of incidence across the entrance to the gasifier turbine rotor, said speed responsive lock-up means including a clutch and a gear set, said clutch and gear set being conditioned at a predetermined compressor discharge pressure and gasifier turbine speed to join said first and second shaft portions together to produce equal gasifier turbine and compressor speeds at a predetermined load range of engine operation to maintain a first incidence angle of inlet gas flow at the entrance to the gasifier turbine rotor for optimal efficiency of flow of motive fluid thereacross, said clutch being conditioned upon gasifier turbine speed in a second predetermined speed range of operation to interpose said gear set between said gasifier compressor and said gasifier turbine to cause said gasifier turbine to rotate at a speed differing from that of said gasifier compressor thereby to maintain incidence angles of attack of motive fluid on said gasifier turbine under the second speed range to avoid excessive blade flow losses in said gasifier turbine.

2. In a dual shaft gas turbine engine having a gasifier turbine for driving a compressor to supply engine air and a power turbine for supplying energy to a driven load and including a combustor for burning air and fuel to supply motive fluid to both the gasifier turbine and the power turbine, the improvement comprising: a two part gasifier shaft including a first portion connected to the gasifier compressor and a second portion connected to the gasifier turbine, a high speed lock-up means for selectively connecting and disconnecting said first and second shaft portions for controlling the angle of gas flow incidence across the entrance to the gasifier turbine rotor, said high speed lock-up means including a speed responsive clutch and a gear set conditioned when said gasifier turbine is at speeds in excess of a predetermined high speed engine operation to join said first and second shaft portions together to produce equal gasifier turbine and compressor speeds at the predetermined high speed of engine operation to maintain a near zero incidence angle between the inlet gas flow at the entrance to the gasifier turbine rotor for optimal efficiency of flow of motive fluid thereacross, said clutch being conditioned upon low load, low speeds of engine operation to interpose said gear set between said gasifier compressor and said gasifier turbine to cause said gasifier turbine to rotate faster than said gasifier compressor thereby to prevent excessively positive incidence angles of attack of motive fluid on said gasifier turbine under low speed conditions of operation thereof.

3. In a dual shaft gas turbine engine having a gasifier turbine for driving a compressor to supply engine air and a power turbine for supplying energy to a driven load and including a combustor for burning air and fuel to supply motive fluid to both the gasifier turbine and the power turbine, the improvement comprising: a two part gasifier shaft including a first portion connected to the gasifier compressor and a second portion connected to the gasifier turbine, a low speed lock-up means for selectively connecting and disconnecting said first and second shaft portions for controlling the gas flow angle of incidence across the entrance to the gasifier turbine rotor, said low speed lock-up means including a speed responsive clutch and a gear set and control means for conditioning said clutch at a predetermined compressor discharge pressure and speed of said second shaft portion to join said first and second shaft portions together to produce equal gasifier turbine and gasifier compressor speeds at a predetermined low speed of operation to maintain a near zero incidence angle between the inlet gas flow at the entrance to the gasifier turbine rotor for optimal efficiency of flow of motive fluid thereacross while eliminating imposition of gear friction losses in the connection between the compressor and gasifier turbine at said predetermined low speed of operation, said control means conditioning said clutch upon speeds in excess of said predetermined low speed of operation to interpose said gear set between said gasifier compressor and said gasifier turbine to cause said gasifier turbine to rotate slower than said gasifier compressor thereby to prevent development of highly negative incidence angles of attack of motive fluid on said gasifier turbine under high speed conditions of operation thereof.

* * * * *